Patented Apr. 20, 1954

2,676,157

UNITED STATES PATENT OFFICE 2,676,157

PROCESS OF FORMING FOAMED PRODUCTS FROM ALDEHYDE MODIFIED ALKYDS AND POLYISOCYANATES

Isaac L. Newell, Wethersfield, Conn., assignor to United Aircraft Corporation, East Hartford, Conn., a corporation of Delaware No Drawing. Application December 2, 1950, Serial No. 198,902

18 Claims. (Cl. 260—2.5)

The present invention relates to a novel and improved synthetic resin and to a novel and improved stable resinous foam.

Objects and advantages of the invention will be set forth in part hereinafter and in part will be obvious herefrom, or may be learned by practice with the invention, the same being realized and attained by means of the processes, steps and combinations pointed out in the appended claims.

The invention consists in the novel steps, processes, compositions and improvements herein shown and described.

The present invention has for its object the provision of a novel and improved thermosetting synthetic resin which has a relatively long gelation period and is useable over a wide range of temperatures. A further object is the provision of a novel and improved thermosetting resin, of the alkyd type, which has superior resistance to alkalis, is easily controlled as to its final molecular weight and viscosity, and which is characterized by a high degree of cross-linkage. The invention further provides an improved resin which is easily reacted to produce a self-intumescent foam with a preponderance of closed cells or bubbles of fairly uniform and accurately controlled size. Still another object of the invention is the provision of such a foam which is of exceedingly low density, has excellent strength properties, is stable, non-corrosive and adheres firmly to many different surfaces. The invention provides a foam which is useable over a wide temperature range, may be of the thermosetting type, and is not affected by most liquids. The invention provides a composition and process by which superior foams may be produced at atmospheric pressures and without requiring the use of molds, dies, or other expensive apparatus.

In particular, the invention finds a great field of usefulness in the filling of hollow steel propeller blades for aircraft, and exhibits numerous, marked advantages over rubber foams which have heretofore been used for that purpose. However, the foam has wider usefulness, particularly when a strong, stable material of low density is required. Other possible applications are in radomes, aircraft structural members, furniture, etc.

Alkyd resins which result from the reaction of polybasic acids with polybasic alcohols have been modified in the past with fatty oils and fatty acids in order to control the reaction and end with a product which is not as brittle as would otherwise be obtained. The reaction is much more easily controlled when modified in this manner. The use of fatty acids and oils, however, makes the final product susceptible to breakdown especially in the presence of alkalis and also prevents the crosslinking of the alkyd molecules with one another.

I have found that the modification of an alkyd resin by the use of aldehydes controls the speed of the reaction so that the final molecular weight and viscosity can be predicted, and that the alkyd so obtained has some of the properties found where crosslinking has taken place. The alkyd also has superior resistance to the effect of alkalies.

Heretofore, synthetic resin foams have been produced which were self-intumescent but did not have great form stability and strength characteristics over a wide range of temperature such as from —70° F. to 200° F. Also, many of these prior foams had widely varying cell sizes all of which disadvantages are overcome by the present invention.

In general the present invention, in its broader aspects comprises a resin formed by the reaction of a polyhydric alcohol and a polybasic acid and with from about 0.3 to about 37 molal percent of an aldehyde which serves to limit the length of the chain formation of the resinous compounds produced by the reaction. Preferably the polyhydric alcohol of the polybasic acid is a tri-functional molecule.

In carrying out the present invention, any polybasic acid may be used with any polyhydric alcohol and any aldehyde may be used. Thus, as examples of the acids which may be used, are the following acids: citric, phthalic, adipic, maleic, sebacic, methylene-disalicylic, and preferably those other dibasic acids in which the carboxy groups are rather large with respect to the remainder of the molecule, and, of course, the anhydrides of such acids may be used if more convenient.

The polyhydric alcohols are preferably not diols, although diols are entirely practical, and the alcohols are preferably alcohols having three or more hydroxy groups close together, as in the iso-triols. Typical of the suitable alcohols are glycerine, sorbitol, mannitol, pentaerythritol, and triols, such as trimethylolpropane. Less desirable are the diols, such as the glycols, particularly if the resin is to be foamed.

The aldehyde is chosen from the class of saturated alkyl aldehydes such as formaldehyde, acetaldehyde, propionaldehyde, butyraldehyde, 2-ethyl butyraldehyde, 2-ethyl hexaldehyde, or from the class of unsaturated aldehydes such as glyoxal, pyruvic aldehyde, crotonaldehyde, 2-ethyl 3-propyl acrolein, or aromatic aldehydes, including benzaldehyde and furfuraldehyde.

I have found that foams which are more heat resistant are obtained with the unsaturated aldehydes having comparatively few numbers of carbon atoms present. Aldehyde-modified alkyd resins produce foams with polyisocyanates which have substantially uniform cell size even when the vertical thickness of the foam is as great as 6 to 15 feet. In other words, the foam is sufficiently rigid, strong and self supporting that a high column may be formed merely by pouring the required quantity of the fluid mass into a vertical container such as a hollow propeller blade.

Of the aldehydes, those which contain 1 to 10 carbon atoms, provide optimum stability of the finished foams at elevated temperatures together with uniformly fine cells when used to modify alkyd resins while those of 10–20 carbons provide fine cells but lower mechanical strengths at high temperatures.

The use of the alkyltriols described above is preferred to other polyhydroxy alcohols as those alkyltriols provide an unusually good stability of the finished foam at elevated temperatures.

The acid number and water content of the alkyd resin are the most important major factors in establishing the density of the foam. The density of the foam may also be varied (controlled) by the addition of suitable reagents, such as ketones, amines, powdered metals and metal oxides, lime, and acids in the alkyd resin, or by imposing restraint on the reacting mixture as it tends to foam. Thus, it is possible, when the mixture is subjected to high pressures, as in a closed mold or die, to prevent the formation of voids and thereby produce a dense, solid resin which is unfoamed.

When foamed, the composition of matter comprises the reaction product of one or more organic polyisocyanates with an alkyd resin, preferably formed from a polyhydroxy alcohol and dicarboxylic acids, and most preferably from alkyltriol of the general formula $$H(CH_2)_nC[CH_2OH]_3$$

(where $n$ is one or more), with one or more dicarboxylic acids and an aldehyde, said mixture cooked to an acid number of from 5 to 75.

In carrying out the process of the present invention for the production of foams, the appropriate quantity of the diisocyanate is thoroughly and rapidly mixed with the prepared alkyd resin and before foaming has proceeded to a substantial extent, the mixture is introduced into the hollow object to be filled with foam. The mixture is allowed to rest and intumesces rapidly, until it reaches constant volume. Thereafter, the foam filled object may be subjected to heat for a definite period and at a controlled temperature to rapidly cure the resin, which is thermosetting or infusible, and to develop its full physical properties.

The resins of the present invention are prepared by heating the reactants together for the required period of time and usually until the reaction has proceeded to a predetermined acid number, thereby producing a resin, which is a thermosetting resin and may be reacted with an organic polyisocyanate and may be rendered insoluble on further heating. It has frequently been found necessary to use reflux condensers or to use pressure on the system in order to prevent loss of reactants during the cooking period.

It will be understood that the foregoing general description and the following detailed description as well are exemplary and explanatory of the invention but are not restrictive thereof.

In order to form a comparison between the resins of the present invention, and a typical resin of the conventional alkyd type, two batches were prepared and treated as follows:

BATCH 1

½ mol phthalic acid
⅓ mol glycerol

BATCH 2

½ mol phthalic acid
½ mol glycerol
¼ mol 2-ethyl 3-propyl acrolein

The reactants were mixed and heated together and samples were removed at the indicated intervals until the temperature of 230° C. was reached.

| | Temp., °C. | Acid No. | Gelation Time at 280° C. | Description of Resin |
|---|---|---|---|---|
| Batch 1: | | | | |
| Original Mix | | 383.2 | | |
| At Melt | 135 | 339.0 | 2 min | White. |
| 10 Min | 155 | 305.2 | 1 min. 45 sec | Light Amber and tacky on cooling. |
| 15 min | 163 | 291.6 | do | No change. |
| 30 min | 175 | 262.9 | 45 sec | Do. |
| 45 min | 195 | 176.2 | 20 sec | Slightly yellower—brittle on cooling. |
| 1 hr. 15 min | 230 | 118.5 | 0 | No change. |
| Batch 2: | | | | |
| Original Mix | | 258.9 | | |
| At Melt | 115 | 223.8 | 6 min. 35 sec | White. |
| 10 min | 165 | 219.4 | 6 min. 30 sec | Light amber—tacky. |
| 15 min | 172 | 201.0 | 5 min. 50 sec | Dark brown—tacky. |
| 30 min | 190 | 167.1 | do | Do. |
| 45 min | 204 | 93.0 | 5 min. 30 sec | Dark brown—brittle. |
| 1 hr. 15 min | 230 | | do | Do. |

The aldehyde-modified alkyd in batch 2 has a high gelation time when the acid number is down to 93.0 compared with zero gelation time with the unmodified alkyd of batch 1 when the acid number is still as high as 118.0.

I have found that unsaturated, and aromatic aldehydes are useful for the modification of alkyd resins, as are the saturated alkyl aldehydes. The following are typical examples of various aldehyde modified resins in accordance with the present invention.

Example 2

The following ingredients were mixed:

| | Grams |
|---|---|
| 1.0 mol phthalic anhydride | 85.0 |
| 2.0 mol adipic acid | 168.0 |
| 0.35 mol glyoxal | 33.7 |
| 4.0 mol trimethylolpropane | 308.0 |
| Total | 594.7 | and were heated in an atmosphere of flowing nitrogen with a reflux condenser for the following time at the temperatures shown and with the following results:

| | | |
|---|---|---|
| 30 min | 125° C. | |
| 45 min | 135° C. | |
| 1 hour | 128° C. | |
| 2 hours | 125° C. | |
| 2 hrs. 30 min | 122° C. | |
| 3 hrs | 120° C. | Water drained from condenser. |
| 3 hrs. 30 min | 135° C. | |
| 4 hrs | 159° C. | Melt became darker in color. |
| 4 hrs. 30 min | 195° C. | Temperature maintained for 30 minutes. Acid number 63.6 |
| 5 hrs | 200° C. | Melt became turbid. Acid number 57.2 |
| 5 hrs. 30 min | 200° C. | Condenser removed. Acid number 54.5 |
| 6 hrs | | Acid number 51.6 |
| 6 hrs. 30 min | | Acid number 40.1 |

After cooking, there remained 510.0 grams of resin which had a moisture content of 0.32% and a Gardner-Holt viscosity "D" (60% solids in butyl acetate). The glyoxal used was a 30.1% solution boiling at 50.4° C. After the reflux condenser was removed, the vapor from the reaction flask was condensed and separated from the reaction mixture. This distillate contained 1.4 grams glyoxal when the reaction was completed.

The resulting alkyd resin is then mixed with an organic polyisocyanate and further treated as follows:

| | Per cent |
|---|---|
| Alkyd resin of Example 2 | 59.60 |
| Toluene diisocyanate | 40.15 |
| Water | .25 |

The above materials are mixed by stirring, and poured into a vessel when foaming action starts. The resulting foam is cured for one hour at 150° F. and three hours at 225° F. The density was found to be 17.35 lbs. per cubic foot and the heat distortion 230° F.

Example 3

The following ingredients were mixed

| | Grams |
|---|---|
| 0.5 mol phthalic anhydride | 42.5 |
| 0.5 mol maleic acid | 33.3 |
| 2.0 mol adipic acid | 168.0 |
| 0.5 mol 2-ethyl butyraldehyde | 28.8 |
| 4.0 mol trimethylolpropane | 308.0 |
| Total | 580.6 | and were heated in an atmosphere of flowing nitrogen for the following time and with the following results, reaching a temperature of 180° C. in one hour and 190° C. in two hours.

| | Acid number |
|---|---|
| 1 hr. 30 min | 70.6 |
| 2 hrs | 57.3 |
| 2 hrs. 30 min | 47.4 |

After cooking, there remained 501.6 grams of resin which had a moisture content of 0.38 and a Gardner-Holt viscosity "E" (60% solids in butyl acetate).

The resulting alkyd resin is then mixed with an organic polyisocyanate and further treated as follows:

| | Per cent |
|---|---|
| Alkyd resin of Example 3 | 59.60 |
| Toluene diisocyanate | 40.15 |
| Water | .25 |

The above materials are mixed by stirring, and poured into a vessel when foaming action starts. The resulting foam is cured for one hour at 150° F. and three hours at 225° F. The density was found to be 12.65 lbs. per cubic foot and the heat distortion 200° F.

Example 4

The following ingredients were mixed:

| | Grams |
|---|---|
| 1.0 mol phthalic anhydride | 85.0 |
| 2.0 mol adipic acid | 168.0 |
| .35 mol furfural | 19.3 |
| 4.0 mol trimethylolpropane | 308.0 |
| Total | 580.3 | and were heated in an atmosphere of flowing nitrogen for the following time at the temperatures shown and with the following results:

| | Acid number |
|---|---|
| 1 hr. 30 min | 108 |
| 2 hrs | 83.3 |
| 2 hrs. 40 min | 70.5 |
| 3 hrs. 20 min | 63.5 |
| 4 hrs | 60.9 |
| 5 hrs | 47.5 |

After cooking there remained 499.3 grams of resin which had a moisture content of 0.20% and a Gardner-Holt viscosity "F" (60% solids in butyl acetate).

The mix was completely melted at 125° C. and water began coming off at 130° C. The melt began to boil at 150° C. after forty-five minutes. Very slight foaming was noticed throughout the cook. The condenser was removed after 2 hours and the temperature was raised to 180° C., then to 200° C. after 3 hours.

The resulting alkyd resin is then mixed with an organic polyisocyanate and further treated as follows:

| | Per cent |
|---|---|
| Alkyd resin of Example 4 | 59.60 |
| Toluene diisocyanate | 40.15 |
| Water | .25 |

The above materials are mixed by stirring, and poured into a vessel when foaming action starts. The resulting foam is cured for one hour at 150° F. and three hours at 225° F. The density was found to be 13.4 lbs. per cubic foot and the heat distortion 200° F.

Example 5

The following ingredients were mixed:

| | Grams |
|---|---|
| 1.0 mol phthalic anhydride | 85.0 |
| 2.0 mol adipic acid | 168.0 |
| 0.35 mol 2-ethyl hexaldehyde | 25.8 |
| 4.0 mol trimethylolpropane | 308.0 |
| Total | 586.8 | and were heated in an atmosphere of flowing nitrogen for the following time at the temperatures shown and with the following results:

| | Acid number |
|---|---|
| 1 hr. 30 min | 55.6 |
| 1 hr. 45 min | 48.1 |

After cooking there remained 517.4 grams of resin which had a moisture content of 0.19% and a Gardner-Holt viscosity greater than "D" (60% solids in butyl acetate).

The boiling point of 2-ethyl hexaldehyde is 163.4° C. The mix was entirely molten at 140° C. Water began coming off at 160° C. and there was moderate foaming. The melt became cloudy after 1 hour and 5 minutes. The reflux condenser was removed after 1 hour and 30 minutes.

The resulting alkyd resin is then mixed with an organic polyisocyanate and further treated as follows:

| | Per cent |
|---|---|
| Alkyd resin of Example 5 | 59.60 |
| Toluene diisocyanate | 40.16 |
| Water | .25 |

The above materials are mixed by stirring, and poured into a vessel when foaming action starts. The resulting foam is cured for one hour at 150° F. and three hours at 225° F. The density was found to be 9.2 lbs. per cubic foot and the heat distortion 200° F.

*Example 6*

The following ingredients were mixed:

| | Grams |
|---|---|
| 1.0 mol phthalic anhydride | 85.0 |
| 2.0 mol adipic acid | 168.0 |
| 0.35 mol 2-ethyl butyraldehyde | 20.0 |
| 4.0 mol trimethylolypropane | 308.0 |
| Total | 581.0 | and were heated in an atmosphere of flowing nitrogen for the following time and with the following results:

| | Acid number |
|---|---|
| 1 hr. 30 min | 57.2 |
| 1 hr. 45 min | 50.5 |

After cooking there remained 502.5 grams of resin which had a moisture content of 0.28% and a Gardner-Holt viscosity "D" (60% solids in butyl acetate).

Boiling point of 2-ethyl butyraldehyde is 116.8° C. The mix was entirely molten at 140° C. Water began coming off at 160° C. and there was moderate foaming. The melt became cloudy after 1 hour and 10 minutes. The reflux condenser was removed after 1 hour and 30 minutes.

The resulting alkyd resin is then mixed with an organic polyisocyanate and further treated as follows:

| | Per cent |
|---|---|
| Alkyd resin of Example 6 | 59.60 |
| Toluene diisocyanate | 40.16 |
| Water | .25 |

The above materials are mixed by stirring, and poured into a vessel when foaming action starts. The resulting foam is cured for one hour at 150° F. and three hours at 225° F. The density was found to be 9.9 lbs. per cubic foot and heat distortion 220° F.

*Example 7*

The following ingredients were mixed:

| | Grams |
|---|---|
| 1.0 mol phthalic anhydride | 85.0 |
| 2.0 mol adipic acid | 168.0 |
| 0.50 mol benzaldehyde | 30.5 |
| 4.0 mol trimethylolpropane | 308.0 |
| Total | 591.5 | and were heated in an atmosphere of flowing nitrogen for the following time and with the following results:

| | Acid number |
|---|---|
| 1 hour 30 min | 75.2 |
| 2 hours | 64.1 |
| 2 hours 30 min | 44.9 |

After cooking there remained 521.5 grams of resin which had a moisture content of 0.44% and a Gardner-Holt viscosity "D" (60% solids in butyl acetate).

The boiling point of benzaldehyde is 179.5° C. The mix was entirely molten at 130° C. Water began coming off at 160° C. and there was slight foaming. The melt became cloudy after 1 hour 30 minutes. The temperature was raised from 180° C. to 200° C. after 2 hours. The reflux condenser was removed after 1 hour 30 minutes.

The resulting alkyd resin is then mixed with an organic polyisocyanate and further treated as follows:

| | Per cent |
|---|---|
| Alkyd resin of Example 7 | 59.60 |
| Toluene diisocyanate | 40.16 |
| Water | .25 |

The above materials are mixed by stirring, and poured into a vessel when foaming action starts. The resulting foam is cured for one hour at 150° F. and three hours at 225° F. The density was found to be 8.65 lbs. per cubic foot and the heat distortion 170° F.

*Example 8*

The following ingredients were mixed:

| | Grams |
|---|---|
| 1.0 mol phthalic anhydride | 85.0 |
| 2.0 mol adipic acid | 168.0 |
| .25 mol 2-ethyl 3-propyl acrolein | 18.0 |
| 4.0 mol trimethylopropane | 308.0 |
| Total | 579.0 | and were heated in an atmosphere of flowing nitrogen for the following time and with the following results:

| | Acid number |
|---|---|
| 1 hr. 30 min | 69.5 |
| 2 hrs. 15 min | 56.0 |
| 3 hrs | 48.8 |

After cooking there remained 504.0 grams of resin which had a moisture content of 0.36% and a Gardner-Holt viscosity "E" (60% solids in butyl acetate).

The melt was completely dissolved at 130° C. Water began coming off at 160° C. and foaming was slight. The melt became turbid after 1 hour 30 minutes. The temperature was raised from 175° C. to 200° C. after 1 hour 30 minutes.

The resulting alkyd resin is then mixed with an organic polyisocyanate and further treated as follows:

| | Per cent |
|---|---|
| Alkyd resin of Example 8 | 59.60 |
| Toluene diisocyanate | 40.16 |
| Water | .25 |

The above materials are mixed by stirring, and poured into a vessel when foaming action starts. The resulting foam is cured for one hour at 150° F. and three hours at 225° F. The density was found to be 9.10 lbs. per cubic foot and the heat distortion 220° F.

Example 9

The following ingredients were mixed:

| | Grams |
|---|---|
| 1.0 mol phthalic anhydride | 85.0 |
| 2.0 mol adipic acid | 168.0 |
| 0.35 mol crotonaldehyde | 14.5 |
| 4.0 mol trimethylolpropane | 308.0 |
| Total | 575.5 | and were heated in an atmosphere of flowing nitrogen for the following time and with the following results:

| | Acid number |
|---|---|
| 1 hr. 30 min | 66.5 |
| 2 hrs | 63.8 |
| 2 hrs. 30 min | 63.7 |
| 3 hrs | 44.6 |

After cooking there remained 505.5 grams of resin which had a moisture content of 0.36% and a Gardner-Holt viscosity of "E" (60% solids in butyl acetate).

Boiling point of crotonaldehyde is 120° C. Water began coming off at 160° C. and there was slight foaming. The melt became cloudy after 1 hour 30 minutes. The condenser was removed after 2 hours and the temperature was raised to 200° C.

The resulting alkyd resin is then mixed with an organic polyisocyanate and further treated as follows:

| | Per cent |
|---|---|
| Alkyd resin of Example 9 | 59.60 |
| Toluene diisocyanate | 40.16 |
| Water | .25 |

The above materials are mixed by stirring, and poured into a vessel when foaming action starts. The resulting foam is cured for one hour at 150° F. and three hours at 225° F. The density was found to be 14.5 lbs. per cubic foot and the heat distortion 230° F.

Example 10

The following ingredients were mixed:

| | Grams |
|---|---|
| 1.0 mol phthalic anhydride | 85.0 |
| 2.0 mol adipic acid | 168.0 |
| 0.35 mol butyraldehyde | 14.5 |
| 4.0 mol trimethylolpropane | 308.0 |
| Total | 575.5 | and were heated in an atmosphere of flowing nitrogen for the following time and with the following results:

| | Acid Number |
|---|---|
| 1 hr. 15 min | 80.6 |
| 1 hr. 45 min | 69.1 |
| 2 hr. 30 min | 63.1 |
| 3 hr. 15 min | 55.0 |
| 3 hr. 45 min | 46.6 |

After cooking there remained 506.5 grams of resin which had a moisture content of 0.23% and a Gardner-Holt viscosity "D" (60% solids in butyl acetate).

Boiling point of butyraldehyde equals 75° C. Water began coming off at 160° C. and there was slight foaming. The melt was clear after 1 hour 15 minutes and became cloudy after 1½ hours. The temperature was raised to 190° C. after 2 hours.

The resulting alkyd resin is then mixed with an organic polyisocyanate and further treated as follows:

| | Per cent |
|---|---|
| Alkyd resin of Example 10 | 59.60 |
| Toluene diisocyanate | 40.16 |
| Water | .25 |

The above materials are mixed by stirring, and poured into a vessel when foaming action starts. The resulting foam is cured for one hour at 150° F. and three hours at 225° F. The density was found to be 11.3 lbs. per cubic foot and the heat distortion 220° F.

Example 11

The following ingredients were mixed:

| | Grams |
|---|---|
| 1.0 mol phthalic anhydride | 85.0 |
| 2.0 mol adipic acid | 168.0 |
| 0.35 mol 2-ethyl 3-propyl acrolein | 25.0 |
| 4.0 mol trimethylolpropane | 308.0 |
| Total | 586.0 | and were heated in an atmosphere of flowing nitrogen for the following time and with the following results:

| | Acid Number |
|---|---|
| 1 hr. 30 min | 90.9 |
| 2 hrs | 69.5 |
| 2 hrs. 30 min | 54.6 |

After cooking there remained 512.5 grams of resin which had a moisture content of 0.40% and a Gardner-Holt viscosity "D" (60% solids in butyl acetate).

Water began coming off at 160° C. and there was slight foaming. The melt was clear after 1½ hours and became cloudy after 2 hours. The temperature was raised to 190° C. after 2 hours.

The resulting alkyd resin is then mixed with an organic polyisocyanate and further treated as follows:

| | Per cent |
|---|---|
| Alkyd resin of Example 11 | 59.60 |
| Toluene diisocyanate | 40.16 |
| Water | .25 |

The above materials are mixed by stirring, and poured into a vessel when foaming action starts. The resulting foam is cured for one hour at 150° F. and three hours at 225° F. The density was found to be 10.35 lbs. per cubic foot and the heat distortion 220° F.

Example 12

The following ingredients were mixed:

| | Grams |
|---|---|
| 1.0 mol phthalic anhydride | 85.0 |
| 2.0 mol adipic acid | 168.0 |
| 0.35 mol pyruvic aldehyde | 48.0 |
| 4.0 mol trimethylolpropane | 308.0 |
| Total | 609.0 | and were heated in an atmosphere of flowing nitrogen for the following time and with the following results:

| | | |
|---|---|---|
| 30 min | 133° C. | |
| 1 hr | 126° C. | |
| 2 hrs | 121° C. | Melt is a very dark brown color. |
| 3 hrs | 120° C. | Water was drained from reflux condenser. |
| 3 hrs. 45 min | 200° C. | |
| 4 hrs | Acid No. 65.0. | |
| 4 hrs. 30 min | 200° C. | Reflux condenser was removed. |
| 5 hrs | Acid No. 53.9. | |
| 5 hrs. 30 min | Acid No. 45.5. | |

After cooking there remained 516.0 grams of resin which had a moisture content of 0.36% and a Gardner-Holt viscosity "E" (60% solids in butyl acetate).

Pyruvic aldehyde (methyl glyoxal) was used as a 30.4% solution (B. P. 72° C.).

The resulting alkyd resin is then mixed with an organic polyisocyanate and further treated as follows:

|  | Per cent |
|---|---|
| Alkyd resin of Example 12 | 59.60 |
| Toluene diisocyanate | 40.16 |
| Water | .25 |

The above materials are mixed by stirring, and poured into a vessel when foaming action starts. The resulting foam is cured for one hour at 150° F. and three hours at 225° F. The density was found to be 9.06 lbs. per cubic foot and the heat distortion 200° F.

*Example 13*

The following ingredients were mixed:

|  | Grams |
|---|---|
| 1.0 mol phthalic anhydride | 85.0 |
| 2.0 mol adipic acid | 168.0 |
| 0.35 mol propionaldehyde | 11.6 |
| 4.0 mol trimethylolpropane | 308.0 |
| Total | 572.6 | and were heated in an atmosphere of flowing nitrogen for the following time and with the following results:

| Time | Temp/Notes |
|---|---|
| 30 min | 155° C. |
| 45 min | 150° C. |
| 1 hr | 140° C. |
| 1 hr. 15 min | 135° C. |
| 1 hr. 30 min | 133° C. |
| 2 hrs | 129° C. |
| 2 hrs. 30 min | 127° C. |
| 3 hrs | 126° C. |
| 4 hrs | 126° C. Water drained from reflux condenser. |
| 4 hrs. 30 min | 160° C. |
| 4 hrs. 40 min | 195° C. Temperature kept at this point 1 hour 20 minutes. |
| 5 hrs | 195° C. Acid No. 56.5. Melt became turbid. |
| 5 hrs. 15 min | Acid No. 55.7. |
| 5 hrs. 45 min | Acid No. 55.3. |
| 6 hrs | 195° C. Reflux condenser was removed. |
| 6 hrs. 15 min | Acid No. 50.7. |

After cooking there remained 500.0 grams of resin which had a moisture content of 0.40% and a Gardner-Holt viscosity "D" (60% solids in butyl acetate).

The resulting alkyd resin is then mixed with an organic polyisocyanate and further treated as follows:

|  | Per cent |
|---|---|
| Alkyd resin of Example 13 | 59.60 |
| Toluene diisocyanate | 40.16 |
| Water | .25 |

The above materials are mixed by stirring, and poured into a vessel when foaming action starts. The resulting foam is cured for one hour at 150° F. and three hours at 225° F. The density was found to be 5.84 lbs. per cubic foot and the heat distortion 190° F.

*Example 14*

The following ingredients were mixed:

1.0 mol phthalic anhydride
2.0 mols adipic acid
0.25 mol 2-ethyl 3-propyl acrolein
4.0 mols glycerine and were heated in an atmosphere of flowing nitrogen for a period of 4 hours. A temperature of 175° C. was reached in 1 hour and maintained at this temperature for 3 hours. The temperature was then raised to 200° C. for an additional hour. The resin was dark amber in color and showed a final acid number of 43.4 with a moisture content of 1.4%.

The resulting alkyd resin is then mixed with an organic polyisocyanate and further treated as follows:

|  | Per cent |
|---|---|
| Alkyd resin of Example 14 | 59.60 |
| Methylene-bis (4-phenyl isocyanate) | 40.16 |
| Water | None |

The above materials are mixed by stirring and poured into a vessel when foaming action starts. The resulting foam was cured for 1 hour at 150° F. and three hours at 225° F. The density was found to be 15.00 lbs. per cubic foot.

In general the aldehyde, alcohol and polybasic acids are preferably cooked until the acid number is from 5 to 75. The alkyd resin or polyester is then reacted with a diisocyanate, or a diisothiocyanate, such as toluene diisocyanate, hexamethylene diisocyanate, and methylene diisocyanate, i. e. methylene-bis (4-phenylisocyanate). The diisocyanate mixed with the alkyd resin or polyester immediately begins to react and the reaction proceeds and may be hastened by heating if desired. In any event the polyisocyanate is thoroughly and rapidly mixed with the polyester. When the resins are to be foamed by the addition of an organic polyisocyanate, low density foams may be obtained when the acid numbers are high, and high density foams are obtained when the acid numbers are low. For example, if it is desired to have foams with density less than 10 lbs. per cubic foot, the acid number should be preferably between 50.0 and 75.0. Where the foam density is required to be from 40 to 50 lbs. per cubic foot, the acid number is preferably from 5.0 to 15.0. To assist in the formation of low density foams, water may be added to the alkyd, before reacting with the isocyanate, up to about 10% of the total mass but preferably not more than 2%. Densities as low as 3 lbs. per cubic foot have been obtained by the addition of water to alkyd resins having high acid numbers.

In general, the diols form foams which are too soft for many purposes, while some of the alchols are more hygroscopic than desirable and thus complicate the production of uniform foams. The following specific examples show various foaming mixtures which result in useful foams, and are prepared from the aldehyde modified alkyd resins set forth above:

In preparing the aldehyde modified alkyd resin one mol of acid is mixed with from 1.00 mol to 2.00 mol and preferably about 1.25 to 1.50 mol of the polyhydroxy alcohol and with from 0.10 mol to 0.75 mol of the aldehyde, preferably about 0.15 mol to 0.45 mol, after which one part of the organic diisocyanate is mixed with from 1 to 4 parts of the alkyd resin having an acid number of 5 to 75 or preferably from 20 to 60, and is mixed with not more than 10% of water and preferably not more than 2% of water.

The same mixtures, as may be foamed, may also be used for the production of dense, solid resin masses by causing the foaming reaction to take place under controlled pressure conditions or while partially or completely filling a mold or die so that no foam is formed or only very minute cells appear in the final mass. In forming such dense resin masses a pressure of from a few pounds to several thousand p. s. i. is applied during the intumescent reaction.

As exemplary of the reaction of normally foaming mixtures under controlled conditions of pressure, the following examples are given:

*Example 15*

The procedure of Example 2 was followed except that the mixture was poured into a vessel in which the foaming was restrained by the application of 200 p. s. i. pressure. The density was found to be 50 pounds per cubic foot, and after curing for one hour at 150° F. and three hours at 225° F., the material was an extremely tough and strong resin.

*Example 16*

The procedure of Example 13 was followed except that the foaming was completely restrained by the application of 1000 p. s. i. pressure. After curing for one hour at 150° F. and three hours at 225° F., an extremely tough and strong solid resin was formed.

The invention in its broader aspects is not limited to the specific process and steps shown and described but departures may be made therefrom within the scope of the accompanying claims without departing from the principles of the invention and without sacrificing its chief advantages.

What is claimed is:

1. A process of forming a foamed resin which comprises treating about one to about four parts of the liquid reaction product from the simultaneous reaction of a mixture consisting of about one mole of a polycarboxylic acid, about one to about two mols of a polyhydric alcohol and about one-tenth to about three-quarters of a mol of an aldehyde, the reaction product having an acid number of from 5 to 75, by mixing with one part of a compound selected from the group consisting of organic polyisocyanates and organic polyisothiocyanates.

2. The process of claim 1 in which the acid is a dicarboxylic acid and the alcohol is an alkyl triol.

3. The process of claim 2 in which the triol is glycerol.

4. The process of claim 3 in which the acid is a mixture of phthalic and adipic acids.

5. The process of claim 4 in which the aldehyde is an unsaturated alkyl aldehyde having not more than 10 carbon atoms.

6. The process of claim 5 in which the organic polyisocyanate is toluene diisocyanate and is unrestrained while foaming.

7. The process of claim 1 in which the foaming of the mixture caused by the addition of the toluene diisocyanate is partially restrained by enclosing the mixture and subjecting it to pressure during the foaming.

8. The process of claim 1 in which the triol is trimethylolpropane, and the acid is phthalic acid.

9. The process of claim 8 in which the organic polyisocyanate is toluene diisocyanate.

10. The process of claim 1 in which the acid is phthalic acid.

11. The process of claim 10 in which the aldehyde is an unsaturated aldehyde.

12. The process of claim 11 in which the polyisocyanate is toluene diisocyanate and the mixture is unrestrained while foaming.

13. The process of claim 1 in which the aldehyde is an unsaturated aldehyde.

14. The process of claim 13 in which the aldehyde has not more than 10 carbon atoms.

15. The process of claim 14 in which the polyisocyanate is toluene diisocyanate and the mixture is unrestrained during foaming.

16. The process of claim 1 in which the aldehyde is a saturated aldehyde.

17. The process of claim 16 in which the aldehyde has not more than 10 carbon atoms.

18. The process of claim 17 in which the polyisocyanate is toluene diisocyanate and the mixture is unrestrained during foaming.

References Cited in the file of this patent

UNITED STATES PATENTS

| Number | Name | Date |
| --- | --- | --- |
| 1,678,105 | Conover | July 24, 1928 |
| 1,867,584 | Moore et al. | July 19, 1932 |
| 2,005,499 | Hill | June 18, 1935 |
| 2,207,626 | Levine | July 9, 1940 |
| 2,282,827 | Rothrock | May 12, 1942 |
| 2,443,736 | Kropa | June 22, 1948 |
| 2,577,279 | Simon et al. | Dec. 4, 1951 |
| 2,577,280 | Simon et al. | Dec. 4, 1951 |
| 2,577,281 | Simon et al. | Dec. 4, 1951 |
| 2,602,783 | Simon et al. | July 8, 1952 |

FOREIGN PATENTS

| Number | Country | Date |
| --- | --- | --- |
| 600,618 | Great Britain | Apr. 14, 1948 |

OTHER REFERENCES

"German Plastics Practice," Feb. 5, 1948, published by De Bell and Richardson, Springfield, Mass., pages 463–464.